(12) United States Patent
Fakoorian et al.

(10) Patent No.: US 12,389,362 B2
(45) Date of Patent: Aug. 12, 2025

(54) APERIODIC AND SEMI-PERSISTENT POSITIONING REFERENCE SIGNAL AND MEASUREMENT GAPS

(71) Applicant: Apple Inc., Cupertino, CA (US)

(72) Inventors: Seyed Ali Akbar Fakoorian, San Diego, CA (US); Amith Chincholi, Cupertino, CA (US); Chunxuan Ye, San Diego, CA (US); Dawei Zhang, Saratoga, CA (US); Haitong Sun, Cupertino, CA (US); Hong He, San Jose, CA (US); Jie Cui, San Jose, CA (US); Kirk Burroughs, Alamo, CA (US); Wei Zeng, Saratoga, CA (US); Weidong Yang, San Diego, CA (US); Yang Tang, San Jose, CA (US); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/755,677

(22) PCT Filed: May 11, 2021

(86) PCT No.: PCT/CN2021/093119
§ 371 (c)(1),
(2) Date: May 5, 2022

(87) PCT Pub. No.: WO2022/236703
PCT Pub. Date: Nov. 17, 2022

(65) Prior Publication Data
US 2024/0163829 A1 May 16, 2024

(51) Int. Cl.
*H04W 64/00* (2009.01)
*H04L 5/00* (2006.01)
*H04W 72/23* (2023.01)

(52) U.S. Cl.
CPC ............ *H04W 64/00* (2013.01); *H04L 5/005* (2013.01); *H04W 72/23* (2023.01)

(58) Field of Classification Search
CPC ...... H04W 64/00; H04W 72/23; H04L 5/005; H04L 5/0053; H04L 5/0098
See application file for complete search history.

(56) References Cited

U.S. PATENT DOCUMENTS

| 2019/0208366 A1* | 7/2019 | Sosnin ................. G01S 13/876 |
| 2020/0028648 A1* | 1/2020 | Akkarakaran ........ H04L 5/0048 |

(Continued)

FOREIGN PATENT DOCUMENTS

| CN | 111226414 | 6/2020 |
| CN | 111670547 | 9/2020 |

(Continued)

OTHER PUBLICATIONS

Beijing Xiaomi Electronics, "Discussion on PRS enhancements", 3GPP TSG_RAN WG2 #112 e Meeting, R2-2009574, Oct. 22, 2020, 3 sheets.

(Continued)

*Primary Examiner* — Afshawn M Towfighi
(74) *Attorney, Agent, or Firm* — Fay Kaplun & Marcin, LLP

(57) ABSTRACT

A base station of a network is configured to transmit a first indication to a user equipment (UE) of a mapping of code points, wherein each code point maps to one or more corresponding aperiodic or semi-persistent positioning reference signals (PRS) to be transmitted from one or more transmission and reception points (TRP), transmit a second indication to the UE of a first one of the mapped code points to activate the one or more corresponding PRSs for reception at the UE and transmit the one or more activated PRSs to the UE.

20 Claims, 5 Drawing Sheets

(56) References Cited

U.S. PATENT DOCUMENTS

| | | | |
|---|---|---|---|
| 2020/0053690 A1* | 2/2020 | Fischer | G01S 5/0236 |
| 2021/0006372 A1 | 1/2021 | Cha et al. | |
| 2021/0289465 A1* | 9/2021 | Lee | H04W 74/02 |
| 2022/0022158 A1* | 1/2022 | Zarifi | H04L 5/0048 |
| 2022/0120841 A1* | 4/2022 | Fischer | H04L 5/0051 |
| 2023/0047727 A1* | 2/2023 | Si | H04W 52/02 |
| 2023/0108914 A1* | 4/2023 | Manolakos | H04W 64/00 370/329 |
| 2023/0146487 A1* | 5/2023 | Chien | H04W 74/006 370/329 |
| 2023/0388072 A1* | 11/2023 | Munier | H04W 76/20 |
| 2024/0121804 A1* | 4/2024 | Li | H04W 72/25 |
| 2024/0187903 A1* | 6/2024 | Hasegawa | H04B 17/328 |
| 2024/0243876 A1* | 7/2024 | Munier | H04L 5/0053 |
| 2024/0329183 A1* | 10/2024 | Manolakos | G01S 5/0244 |
| 2025/0031172 A1* | 1/2025 | Venkatram | H04W 74/002 |

FOREIGN PATENT DOCUMENTS

| | | |
|---|---|---|
| CN | 112369087 | 2/2021 |
| CN | 112771945 | 5/2021 |
| WO | 2020/229567 | 11/2020 |
| WO | 2021/016980 | 2/2021 |
| WO | 2021/059162 | 4/2021 |

OTHER PUBLICATIONS

Huawei et al., "Discussion on-demand PRS", 3GPP TSG_RAN WG2 Meeting #113, R2-2101226, Jan. 14, 2021, 8 sheets.
Nokia, "On-demand PRS transmission considerations", 3GPP TSG_RAN WG2 Meeting #113bis, R2-2103998, Apr. 2, 2021, 3 sheets.
Moderator (CATT), "FL Summary #4 for Potential Positioning Enhancements", 3GPP TSG RAN WG1 Meeting #102-e, R1-2007210, Aug. 27, 2020, 108 sheets.
Moderator (Ericsson), "Output #2 of email discussion [101-e-NR-Pos-02] on DL PRS and UL SRS for NR positioning in rel16 maintenance", 3GPP TSG-RAN WG1 Meeting #100-e, R1-2005001, Jun. 8, 2020, 74 sheets.
Moderator (Intel Corporation), "Summary of E-mail Discussion [104-e-NR-Pos-01]", 3GPP TSG RAN WG1 Meeting #104-e, R1-2101836, Feb. 1, 2021, 28 sheets.
Moderator (Intel Corporation) et al., "Feature Leads Summary for NR Positioning Maintenance—AI 7.2.8", 3GPP TSG RAN WG1 Meeting #104-e, R1-2101835, Jan. 26, 2021, 22 sheets.
Qualcomm Incorporated, 3GPP TSG-RAN WG2 Meeting #109bis-e, R2-2003349, Apr. 10, 2020, 33 sheets.

\* cited by examiner

12,389,362 B2

APERIODIC AND SEMI-PERSISTENT POSITIONING REFERENCE SIGNAL AND MEASUREMENT GAPS

BACKGROUND

A user equipment (UE) may establish a connection to at least one of a plurality of different networks or types of networks, including a 5G New Radio (NR) network. Various positioning methods exist in NR for the network to locate the UE, including downlink (DL)-based positioning, e.g., DL time difference of arrival (DL-TDOA), uplink (UL)-based positioning, e.g., UL-TDOA, and combined DL+UL-based positioning, e.g., multi-cell round trip time (RTT). In the DL and DL+UL-based positioning methods, a positioning reference signal (PRS) is transmitted on the DL from each of multiple network nodes, i.e., positioning transmission and reception points (TRP), to the UE so that the DL arrival timings of the respective PRSs at the UE may be determined, and a location of the UE determined therefrom.

In current specifications, each positioning TRP configures a respective PRS for the UE without indications from the location management function (LMF) or the UE. However, in Rel-17, on-demand DL PRS, e.g., UE-requested or LMF-requested DL PRS, is recommended for implementation.

SUMMARY

Some exemplary embodiments are related to a processor of a base station of a network configured to perform operations. The operations include transmitting a first indication to a user equipment (UE) of a mapping of code points, wherein each code point maps to one or more corresponding aperiodic or semi-persistent positioning reference signals (PRS) to be transmitted from one or more transmission and reception points (TRP), transmitting a second indication to the UE of a first one of the mapped code points to activate the one or more corresponding PRSs for reception at the UE and transmitting the one or more activated PRSs to the UE.

Other exemplary embodiments are related to a processor of a base station of a network configured to perform operations. The operations include transmitting an indication to a user equipment (UE) of a code point, wherein the code point maps to one or more corresponding aperiodic or semi-persistent positioning reference signals (PRS) to be transmitted from one or more transmission and reception points (TRP) located at the base station, the indication activating the one or more corresponding PRSs for reception at the UE and transmitting the one or more activated PRSs to the UE.

Still further exemplary embodiments are related to a processor of a user equipment configured to perform operations. The operations include receiving a first indication from a base station of a mapping of code points, wherein each code point maps to one or more corresponding aperiodic or semi-persistent positioning reference signals (PRS) to be transmitted from one or more transmission and reception points (TRP), receiving a second indication from the base station of a first one of the mapped code points to activate the one or more corresponding PRSs for reception at the UE and measuring the one or more activated PRSs.

DETAILED DESCRIPTION

Figure 1:
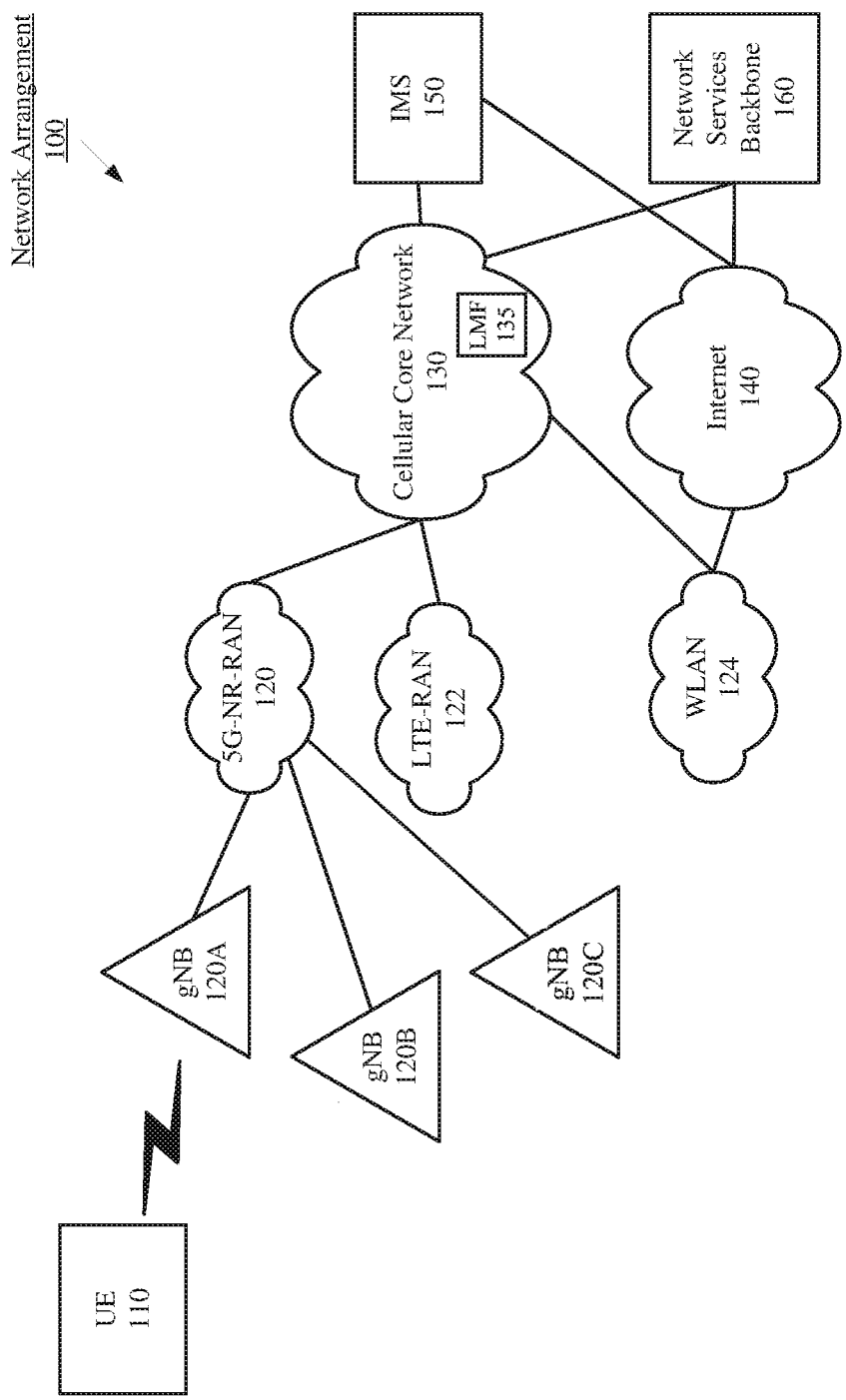
FIG. 1 shows a network arrangement according to various exemplary aspects.

The exemplary aspects may be further understood with reference to the following description and the related appended drawings, wherein like elements are provided with the same reference numerals. The exemplary embodiments describe operations for aperiodic (AP) or semi-persistent (SP) positioning reference signal (PRS) transmissions from one or more transmission and reception points (TRP).

In current specifications, PRS may be configured only for periodic transmissions. The exemplary embodiments described herein relate to PRS being transmitted on-demand, e.g., in response to a request from a user equipment (UE) or a location management function (LMF) of the 5G core network (5GC). In one aspect of the present disclosure, operations are described for activating the PRS for reception at the UE. For example, an AP-PRS may be activated via downlink control information (DCI) and an SP-PRS may be activated via a medium access control (MAC) layer control element (MAC-CE). In some embodiments, a serving cell activates the PRS transmissions for multiple TRPs at both the serving cell and neighboring cells, while in other embodiments each TRP configured for a PRS transmission activates its respective PRS transmission.

In another aspect of the present disclosure, enhancements are described with respect to the currently specified measurement gap (MG) used by the UE to conduct PRS measurements. In some embodiments, a measurement bandwidth part (M-BWP) is introduced that may be used for PRS measurements instead of a measurement gap. To be explained in detail below, various implementation considerations for the M-BWP are described, including operations for configuring the M-BWP and defining UE behavior within the M-BWP.

The exemplary aspects are described with regard to a user equipment (UE). However, the use of a UE is provided for illustrative purposes. The exemplary aspects may be utilized with any electronic component that may establish a connection with a network and is configured with the hardware, software, and/or firmware to exchange information and data with the network. Therefore, the UE as described herein is used to represent any electronic component that is capable of communications with a network including requesting PRS transmissions from multiple TRPs, receiving a configuration for performing the PRS measurements, and further operations to be described in detail below.

The exemplary aspects are described with regard to the network being a 5G New Radio (NR) network and a base station being a next generation Node B (gNB). The 5G NR network may utilize various positioning methods for locating connected UEs. However, the use of the 5G NR network, the gNB, and the described positioning methods are provided for illustrative purposes. The exemplary aspects may apply to any type of network that utilizes similar functionalities.

In addition, throughout this description, a gNB may be referred to as a "serving cell." A gNB that is acting as a serving cell is the cell to which a UE is currently connected, e.g., the UE may be in a Radio Resource Control (RRC) Connected state with the gNB and may be actively exchanging data and/or control information with the base station. A gNB may also be referred to as a "positioning gNB," a "positioning node" or a "positioning cell." A gNB acting as a positioning cell is a base station that is assisting in locating the UE, e.g., transmitting positioning reference signals (PRS) to the UE to assist in locating the UE. A gNB may simultaneously act as a serving cell and a positioning cell with respect to a UE or may act only as a positioning cell for a UE. Additionally, throughout this description a gNB may be referred to as a "neighbor cell" or "neighboring cell." The neighboring cell, according to the present disclosure, does not act as a serving cell for the UE, however certain signals may be exchanged between the neighboring cell and the UE without entering the RRC Connected state. One or more neighboring cells may act as additional positioning gNBs to assist in locating the UE.

A serving cell or a neighbor cell acting as a positioning gNB may include one or more transmission and reception points (TRP), e.g. a first TRP and a second TRP. One or more of the TRPs located at a particular positioning gNB may be used in the exemplary positioning methods and may be referred to as a "positioning TRP." Multiple positioning TRPs may be located at a single positioning gNB.

Furthermore, throughout this description, the terms "positioning reference signal" or "PRS" are used to describe the signals transmitted by the positioning cells/TRPs to the UE to allow the network to locate the UE. Those skilled in the art will understand that the PRS may also be used for other purposes in addition to locating the UE. Additionally, other types of reference signals may be used to locate the UE. Thus, the PRS described herein is not limited to any specific type of reference signal.

FIG. 1 shows an exemplary network arrangement 100 according to various exemplary aspects. The exemplary network arrangement 100 includes a user equipment (UE) 110. Those skilled in the art will understand that the UE may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g. legacy cellular networks) and the UE 110 may also communicate with networks over a wired connection. With regard to the exemplary aspects, the UE 110 may establish a connection with the 5G NR-RAN 122.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A, the gNB 120B and/or the gNB 120C. Reference to three gNBs 120A, 120B, 120C is merely for illustrative purposes. The exemplary aspects may apply to any appropriate number of gNBs. In this example, the three gNBs may be utilized as positioning gNBs for transmitting PRSs to a target UE. However, additional gNBs may also be used as positioning gNBs for the UE 110. In addition, each of the positioning gNBs may comprise multiple transmission and reception points (TRPs), wherein one or more of the TRPs transmit a respective one or more PRS to the target UE. The target UE may then provide measurements for the received PRSs, e.g., PRS timing estimations, to the network so that the network may determine a location of the target UE therefrom, to be described in further detail below. Thus, as described above, the exemplary embodiments may apply to any positioning arrangement including the base stations (e.g., gNBs) transmitting the PRS, the TRPs transmitting the PRS, etc. Thus, throughout this description, when it is described that a component (e.g., gNB, TRP, etc.) is transmitting PRS, it should be understood that this equally applies to any other component that is configured to transmit PRS.

In addition to the networks 120, 122 and 124 the network arrangement 100 also includes a cellular core network 130, the Internet 140, an IP Multimedia Subsystem (IMS) 150, and a network services backbone 160. The cellular core network 130, e.g. the 5GC for the 5G NR network, may be considered to be the interconnected set of components that manages the operation and traffic of the cellular network. The cellular core network 130 also manages the traffic that flows between the cellular network and the Internet 140. The core network 130 may include a location management function (LMF) 135 to support location determinations for a UE. As will be described further below, in the exemplary aspects described herein, the LMF 135 may perform operations including requesting an on-demand PRS for transmission to the target UE, providing assistance data to the UE (via the serving gNB) for activating a PRS to be transmitted from one or more TRPs or gNBs, and other aspects of the positioning method for the target UE, such as receiving PRS estimations from the UE (via the serving gNB) and determining a position of the target UE from the PRS measurements. It should be understood that the LMF 135 is not required to be in the corer network 130. The LMF 135 may reside on a separate server(s) that are connected to the core network 130, e.g., in a manner similar to the IMSD 150 or may reside within the RAN, e.g., 5G NR-RAN 120.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
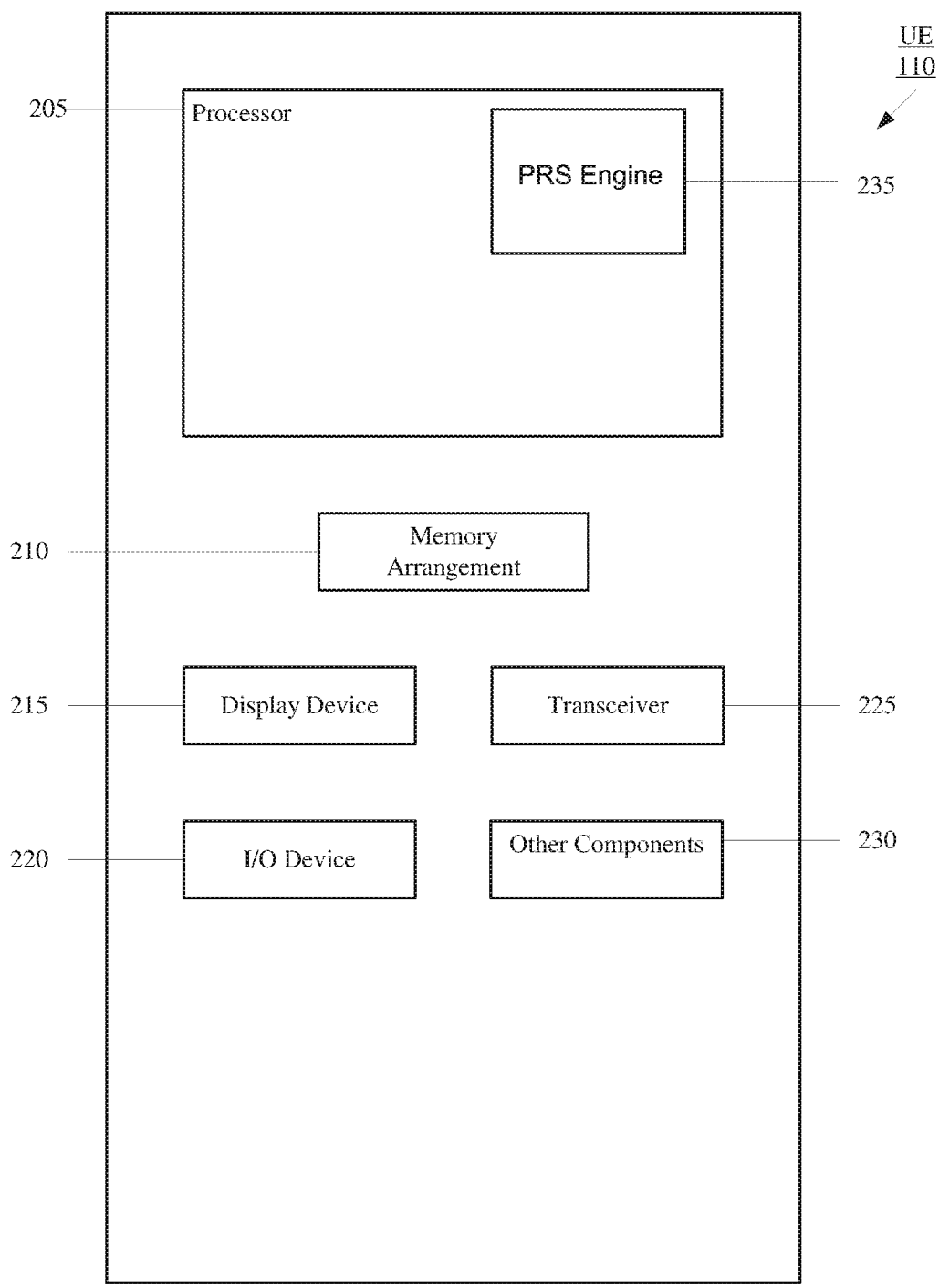
FIG. 2 shows an exemplary UE according to various exemplary aspects.

FIG. 2 shows an exemplary UE 110 according to various exemplary aspects. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a PRS engine 235 for performing operations including receiving aperiodic (AP) or semi-persistent (SP) PRS configurations from one or more network cells and/or TRPs, performing timing estimations on the configured PRSs, and reporting the same to the network, to be described in further detail below. In addition, the processor 205 may perform operations for switching into and out of a measurement bandwidth part (M-BWP) in which the PRS transmissions are measured and processed according to various rules, relative to other transmissions/receptions that may be configured during the M-BWP.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary aspects may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
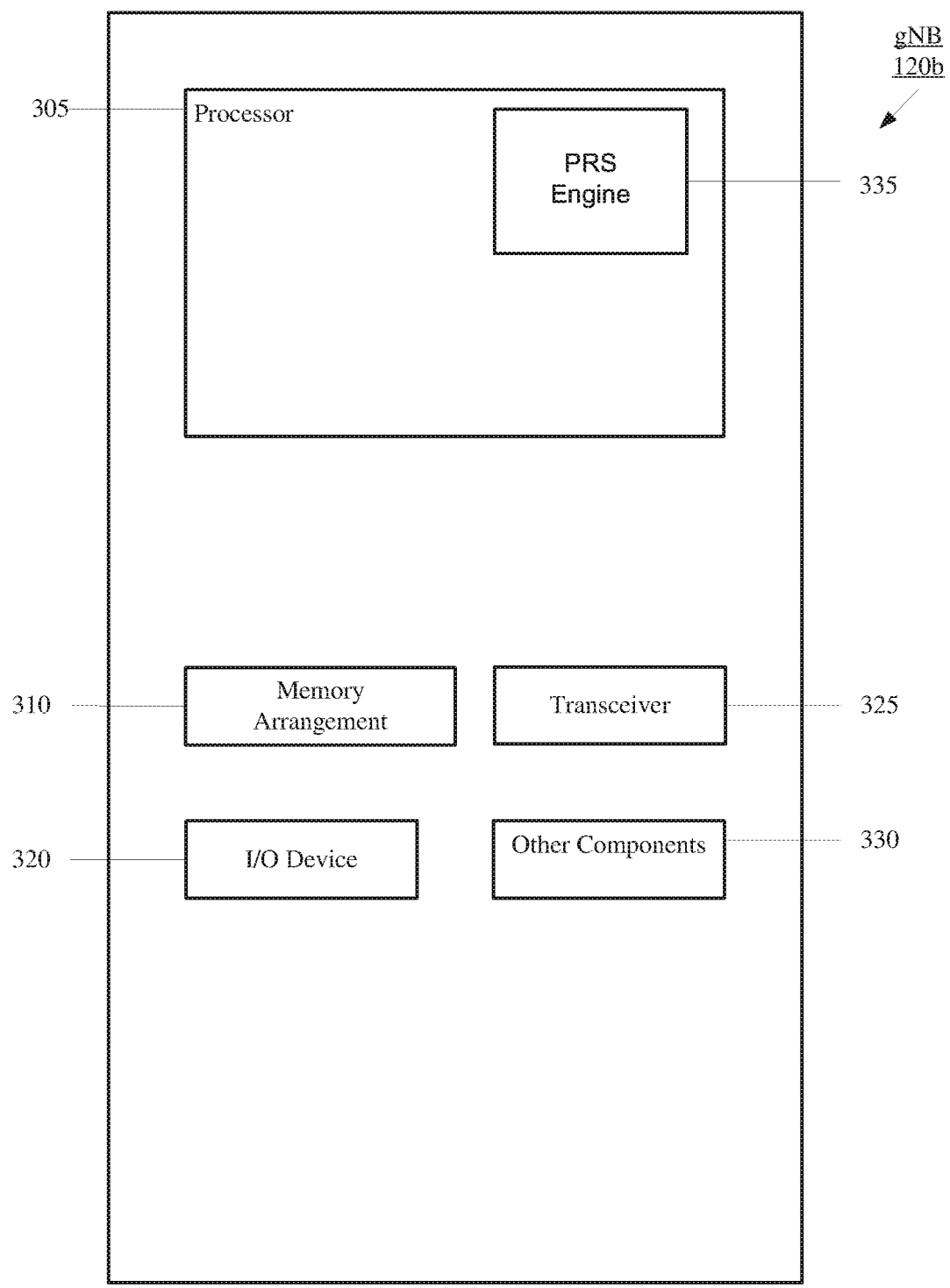
FIG. 3 shows an exemplary network base station according to various exemplary aspects.

FIG. 3 shows an exemplary network cell, in this case gNB 120A, according to various exemplary aspects. As noted above with regard to the UE 110, the gNB 120A may represent a serving cell for the UE 110. The gNB 120A may represent any access node of the 5G NR network through which the UE 110 may establish a connection and manage network operations. Additionally, the gNB 120A may represent a positioning node used in a positioning method implemented by the network to locate a target UE. The gNB 120A illustrated in FIG. 3 may also represent the gNB 120B or the gNB 120C.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, when the gNB 120A is a serving gNB for a UE, the engines may include a PRS engine 335 for performing operations including activating PRS receptions for the UE for PRS transmissions from one or more TRPs, e.g. including PRS to be transmitted from TRPs located at neighboring gNBs. When the gNB 120A is a neighbor gNB for the UE, the PRS engine 335 may perform operations including activating PRS receptions for the UE for PRS transmissions from one or more TRPs located only at the gNB 120A. When the gNB 120A serves as a positioning gNB for the UE, which may correspond to either one of a neighboring gNB or a serving gNB, the PRS engine 335 may perform operations including transmitting PRSs activated for transmission from TRPs belonging to the gNB 120A. These scenarios and additional operations will be described in further detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100, e.g. if the gNB 120A serves as a PCell or an SCell to either or both of the UEs 110, 112. The transceiver 325 may operate on a variety of different frequencies or channels (e.g., set of consecutive frequencies). Therefore, the transceiver 325 may include one or more components (e.g., radios) to enable the data exchange with the various networks and UEs.

On-Demand Positioning Reference Signal (PRS)

Various positioning methods exist in NR for the network to locate the UE, including downlink (DL)-based positioning, e.g., DL time difference of arrival (DL-TDOA), uplink (UL)-based positioning, e.g. UL-TDOA, and combined DL+UL-based positioning, e.g., multi-cell round trip time (RTT). In the DL and DL+UL-based positioning methods, a positioning reference signal (PRS) is transmitted on the DL from each of multiple network nodes, i.e., positioning transmission and reception points (TRP), to the UE so that the DL arrival timings of the respective PRSs at the UE may be determined, and a location of the UE determined therefrom. The positioning reference signal (PRS) may be transmitted in the downlink (DL) by multiple transmission and reception points (TRP) to locate a user equipment (UE). In Rel-16, the PRS is specified only for periodic transmission and is not specified for aperiodic (AP) or semi-persistent (SP) transmission.

In RAN1 #103e, as part of Rel-17 enhanced positioning (ePos) SI, enhancements were recommended, from a physical layer perspective, for on-demand transmission and reception of downlink (DL) positioning reference signal (PRS). The on-demand PRS may comprise a UE-initiated request for the on-demand DL PRS or a location management function (LMF)-initiated (network-initiated) request for the on-demand DL PRS. These two enhancements are recommended for both DL-only positioning methods (UE-based) and DL+UL positioning methods (UE-assisted). The DL PRS transmitted in response to the request from the UE or the LMF would take the form of AP-PRS or SP-PRS. The AP-PRS reception may be activated by a downlink control information (DCI), and the SP-PRS reception may be activated by a medium access control (MAC) control element (MAC-CE).

In current specifications, TRPs configure PRSs without indications from the LMF or the UE (unlike SRS configuration, where the LMF may indicate desired positioning SRS configurations). For on-demand PRS from the LMF or the UE for PRS transmission from multiple TRPs, it is not specified how the UE is to be indicated for activation of the PRSs.

AP-PRS and SP-PRS Activation

According to various exemplary embodiments described herein, signaling procedures are described for activating aperiodic (AP) or semi-persistent (SP) PRS receptions at a UE. The AP- or SP-PRS may be transmitted from one or multiple TRPs. When the PRS is activated, the UE expects to receive the PRS from the TRP from which it was transmitted. To be described in detail below, in some embodiments, the PRS transmissions from each of the TRPs, including the TRPs of neighboring cells, may be activated by the serving cell. In other embodiments, the PRS to be transmitted by a certain TRP is activated by that TRP which will be transmitting the PRS. In still other embodiments, a combination of the above options may be used, where the serving cell activates the PRSs for each of the TRPs belonging to the serving cell, while each PRS from a TRP of a neighboring cell is activated by the TRP transmitting the PRS.

In a first option, for AP-PRS activation for multiple PRS associated with one or more TRPs, a single DCI activates the multiple PRSs. The single DCI may include a code point, e.g., a bit string comprising some number of bits (e.g. two bits), that maps to a combination of PRS configurations and TRPs.

In this case, each code point is mapped to a combination of PRS configurations and TRPs. The association between TRPs and PRSs may be indicated to the UE in various manners. For example, in one option, the association is indicated by the LMF through an LTE positioning protocol (LPP) message, e.g., "provide assistance data," and/or broadcast by the serving gNB in a positioning SIB (posSIB). In another option, the association is RRC configured by the serving gNB.

The code point included in the DCI informs the UE of the PRSs to be expected from one or more TRPs. For example, the bit string 00 may map to (PRS0, TRP0) and (PRS3, TRP0), and the bit string 01 may map to (PRS0, TRP0) and (PRS1, TRP1). Although a two-bit code point is described, the bit string may include more than two bits. The activation DCI may be UE-specific or may be a group common DCI (GC-DCI), where it can be monitored respectively in the UE-specific search space (USS) or the Type-3 common search space (CSS).

In a second option, each TRP activates PRSs that will be transmitted by that TRP only. Therefore, multiple DCI may be received at the UE from multiple TRPs, wherein each DCI associates one or more PRS with a respective TRP from which it was transmitted. Similar to the first option, the DCI may include a bit string that maps the code point to a PRS. For example, the bit string 00 included in a DCI from TRP0 may map to (PRS0, PRS1) from TRP0, and the bit string 00 included in a DCI from TRP1 may map to (PRS4, PRS5) from TRP1. Similar to the first option, the association between code points and PRS may be indicated via LMF and/or posSIB, or via RRC.

In a third option, a combination of the first two options may be used to activate PRS from multiple TRPs. For example, the first option, where a single DCI activates PRSs from multiple TRPs, may be used when the multiple TRPs belong to the serving cell. For example, the serving cell may indicate in a single DCI a first PRS associated with a first TRP at the serving cell and a second PRS associated with a second TRP at the serving cell. The second option, where each TRP activates PRSs transmitted from that TRP, may be used for TRPs belonging to neighboring cells.

With respect to semi-persistent (SP) PRS activated by MAC-CE, a similar state mapping may be used as described above. For example, a code point as described above may be included in a MAC-CE transmitted from one or multiple TRPs. Similar to the AP-PRS activation, for the SP-PRS activation, the association between PRS and TRP for a set of code points may be indicated via LMF, posSIB, or RRC.

Figure 4:
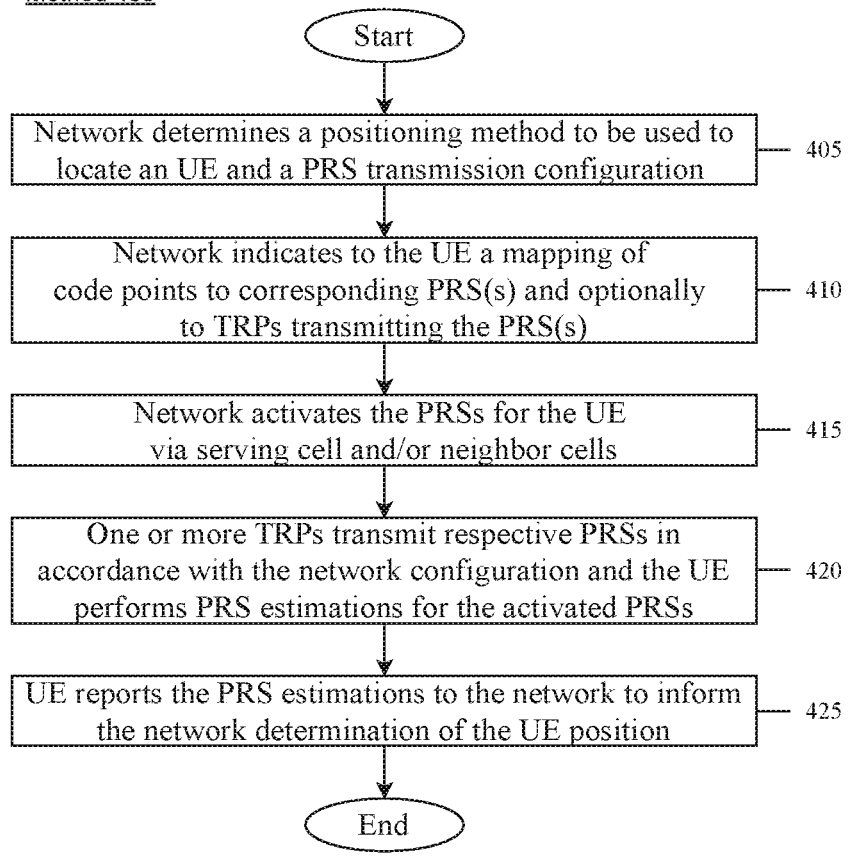
FIG. 4 shows a method for positioning reference signal (PRS) activation wherein the PRS is aperiodic (AP) or semi-persistent (SP).

FIG. 4 shows a method 400 for positioning reference signal (PRS) activation wherein the PRS is aperiodic (AP) or semi-persistent (SP). The exemplary method 400 may be used as an aspect of a positioning method for locating a UE. However, the method 400 relates primarily to the activation of multiple PRSs, wherein the PRSs are transmitted from a single TRP or multiple TRPs to a UE. As discussed above, the PRS transmission(s) may be requested on-demand by the UE or by the LMF. However, the request itself is outside the scope of the exemplary method 400. The method 400 may also be used in a network-initiated scenario.

In 405, the network determines a positioning method to be used to locate the UE and a PRS transmission configuration including PRS transmissions from one or more TRPs located at one or more network cells, e.g., at the serving cell and at least one neighboring cell. The positioning method may be DL-based, e.g. DL-TDOA, or DL+UL-based, e.g. multi-cell RTT. That is, the positioning method to be used by the network includes the transmission of multiple PRSs from one or more TRPs. In one example, the TRP(s) used in the positioning method may be located only at the serving cell, e.g., the serving gNB, for the UE. In another example, the TRPs used in the positioning method may be located at both the serving cell and one or more neighboring cells.

In 410, the network indicates to the UE, via the serving cell, a mapping of code points to corresponding PRS(s) and optionally to TRPs transmitting the PRS(s). For example, as discussed in the first option above, the code point may map to a combination of PRS configurations and TRPs. In another example, as discussed in the second option above, the code point may map to PRS configurations only, wherein the TRP is not explicitly associated with the PRS, but is implicitly determined based on the TRP activating the PRSs.

In 415, the network activates the PRSs for the UE via the serving cell and/or neighbor cells. When the PRS transmission is aperiodic, the network may activate the PRS via an indication in a DCI, e.g., UE-specific or GC-DCI. When the PRS transmission is semi-persistent, the network may activate the PRS via an indication in a MAC-CE. All the PRSs may be activated by the serving cell only, as discussed in the first option above, by indicating a code point that maps to configured PRSs from specific TRPs, including TRPs located at the serving cell and at neighboring cells. In another embodiment, as discussed in the second option above, each TRP that is configured to transmit a PRS, including TRPs at the serving cell and TRPs at neighboring cells, indicates a code point that maps to configured PRSs for the particular TRP. The TRP corresponding to the PRS is determined implicitly as the TRP that is transmitting the indication. In still another embodiment, the serving cell may activate PRSs to be transmitted from TRPs at the serving cell, while TRPs at neighboring cells activate PRSs to be transmitted by the indicating TRP.

In 420, the one or more TRPs transmit respective PRSs in accordance with the network configuration and the UE performs PRS estimations for the activated PRSs.

In 425, the UE reports the PRS estimations to the network to inform the network determination of the UE position.

Enhancements Related to Measurement Gap (MG) for Positioning

A UE may be configured with a measurement gap (MG) for performing frequency measurements while other capabilities, such as transmitting/receiving data, are suspended. The measurement gap configuration may depend on the capability of the UE, the active BWP and/or the operating frequency. The measurement gap may be of a predefined duration and repeat periodically. Typically, a UE will tune away from a currently connected network or frequency band during the measurement gap to measure signals associated with other networks and/or at different frequencies than that on which it is currently operating. During this measurement gap, the UE is not available to the currently connected network, e.g., it is neither transmitting signals to nor receiving signals from the currently connected network.

In Rel-16 NR Positioning, the UE is not expected to perform PRS measurements outside of the configured measurement gap (MG). The MG may be configured outside the active DL bandwidth part (BWP) and/or with a numerology different from that of the active DL BWP. The following issues may arise with respect to measurements restricted in the configured MG.

First, the latency for requesting and configuring the MG may be relatively high, considering the multiple RRC messages exchanged between UE and gNB. For example, each RRC message exchange requires approximately 10 ms. Second, a misalignment may occur between the PRS periodicity and the MG length, resulting in resource inefficiency and/or an increase in latency. Third, certain data reception/transmission is not expected within the MG, depending on the type of MG. If the UE is configured with a FR1 MG (gapFR1), the UE is not expected to receive/transmit across all CCs within FR1. If the UE is configured with a FR2 MG (gapFR2), the UE is not expected to receive/transmit across all CCs within FR2. If the UE is configured with a UE MG (gapUE), the UE is not expected to receive/transmit across all CCs within either FR1 or FR2.

Enhanced signaling and procedures for reducing NR positioning latency, including DL and DL+UL positioning methods. This may include a latency reduction related to the measurement gap. The signaling and procedures for the reception of DL PRS may be enhanced to reduce NR positioning latency, e.g., by introducing priority rules for the reception of DL PRS.

Further, enhancements of signaling and procedures may be used to improve positioning latency of the Rel-16 NR positioning methods, for DL and DL+UL positioning methods, including: latency reduction related to the request and response of location measurements or location estimate and positioning assistance data; latency reduction related to the time needed to perform UE measurements; and latency reduction related to the measurement gap.

Measurement Bandwidth Part (M-BWP)

According to various exemplary embodiments described herein, a specific BWP may be indicated to the UE in which the UE may perform positioning measurements, referred to herein as a measurement BWP (M-BWP). The M-BWP may be used for the positioning measurements rather than configuring a MG for such measurements. The M-BWP configuration may reduce latency relative to a MG configuration, as fewer signals/messages need to be exchanged.

The UE may be configured with at least one measurement bandwidth (M-BWP) during or after RRC connection establishment with a serving gNB. The M-BWP configuration includes an association between the M-BWP and TRPs for PRS transmission. Thus, the UE has knowledge of which PRS will be transmitted from which TRPs when the M-BWP is entered.

The UE may be indicated to switch to the M-BWP in the following ways. In a first option, the M-BWP may be indicated in a UE-specific DCI. A UE-specific DCI may indicate up to four BWPs (via a BWP-ID), and one or more of the configured BWP-IDs may be allocated to an M-BWP. In a second option, the M-BWP may be indicated in a group-common DCI (GC-DCI). In a third option, the M-BWP may be indicated in a periodic higher layer configured procedure.

The PRSs to be transmitted in the M-BWP, from a single TRP or multiple TRPs (m-TRP), are associated with the M-BWP configuration. Thus, when the UE is indicated to switch to the M-BWP, the UE also knows which TRP(s) the PRS transmission(s) is expected from. This indication may come from e.g. the LMF. Alternatively, each M-BWP may be indicated by a particular serving cell, wherein the UE expects to receive PRS transmissions from TRPs associated with that serving cell on the configured M-BWP. For example, the serving cell may comprise multiple TRPs associated with the serving cell, each of which is tied to particular PRSs.

Additionally, the UE may be informed of timing information for the PRS measurements on the M-BWP, e.g., the offset and duration for which the M-BWP will last. In one option, the M-BWP configuration may include the timing information. Alternatively or additionally, the M-BWP indication, e.g., the DCI, may include the timing information. In this scenario, when the M-BWP is indicated, the UE may first switch to a default BWP, or to the active BWP, before switching to the M-BWP after the offset, i.e., at the start of the duration. After the duration, the UE may stay in the M-BWP until a further indication is received to switch to another (regular) BWP. When the further indication is received, via e.g. DCI, the UE would then switch to the newly indicated BWP.

When the UE receives the indication to switch to the M-BWP, the following options are available with respect to UE data transmission/reception within the M-BWP.

In a first option, the UE is not expected to transmit or receive data within the M-BWP. Thus, the UE operation in the M-BWP, according to the first option, is similar to the UE operation in a MG. However, the latency for the UE to enter into the M-BWP is reduced relative to the MG.

According to the first option, the network will not schedule any dynamic transmissions/receptions for the UE, and any configured transmissions scheduled during a duration of the M-BWP, e.g. any CSI-RS reception and/or HARQ-ACK transmissions, may be dropped. Alternatively, these transmissions/receptions may be delayed until the time at which the UE exits the M-BWP, if possible.

In some embodiments, according to the first option, the following alternatives are available when the UE is indicated to switch to the M-BWP for a PRS measurement and the M-BWP is different from the current active BWP, and L3 mobility/radio resource management (RRM) measurement opportunities (MO) are configured on the current active BWP.

In some exemplary embodiments, the L3/RRM measurement configured during the PRS measurement on the M-BWP is dropped.

In other exemplary embodiments, a sharing factor is introduced for MO sharing between the PRS measurement and the mobility/RRM measurement. In other words, the PRS measurement is muted for some PRS MOs, and the mobility/RRM measurement is muted for some mobility/RRM MOs.

If the UE is configured to stay on the M-BWP until all PRS measurements are completed, i.e., the UE does not switch back to the active BWP after each PRS measurement, then a MG may be used for the RRM measurement. In other words, the MG would cause the UE to tune away from the M-BWP configuration so that the RRM measurement may be performed.

If the UE is configured to switch back to the active BWP after each PRS measurement, then a MG would not be needed for the RRM measurement.

Returning to the various options that are available with respect to UE data transmission/reception within the M-BWP, in a second option, the UE may continue to transmit and receive data within the M-BWP except during the measurement and processing window for PRS reception. In current specifications, the measurement and processing window is defined as a function of (N, T) and is based on UE capability, wherein T refers to the total PRS processing window and N refers to the PRS measurement window (in milliseconds), wherein T>N. For example, for a window (6,8), the UE measures 6 ms of PRS and requires an additional 2 ms to process the PRS measurements (for a total of 8 ms. The processing and measurement window is based on UE capability, and may be reported to the network so that the network can schedule PRS transmissions and/or data transmissions/receptions in accordance therewith.

Thus, according to the second option, the UE may not transmit/receive during the PRS processing window within the M-BWP, but may transmit/receive within the M-BWP outside the processing window. The duration of the M-BWP cannot be less than the duration of the PRS processing window.

In a third option, the UE may continue to transmit and receive within the M-BWP, even within the PRS processing window. However, to implement the third option, there may be an alteration to the UE capability.

With the existing UE capability, no other processing is expected during the processing window (N, T). Thus, a new UE capability may be defined with respect to the PRS processing window, wherein transmission/reception of other signals is allowed within the PRS processing window. Relative to the example provided above, where the window (6,8) is defined for the UE, a new window according to the new UE capability may comprise the values (6,10), wherein 6 ms are reserved for PRS measurement, 2 ms are reserved for PRS processing, and an additional 2 ms may be used for data reception/transmission, e.g., PDSCH reception.

However, once the UE is allowed to transmit/receive other signals during the processing window, there is the potential for a transmission/reception to collide in time and frequency with a DL-PRS reception at the UE within the M-BWP. Thus, priority rules may be defined for such a scenario. The following examples are available with respect to the priority rules.

In a first example, the DL-PRS within the M-BWP has the highest priority over all other DL channels. For example, dynamically scheduled signals, e.g., DG-PDSCH, and configured signals/channels, e.g., CSI-RS and SPS-PDSCH, have a lower priority than the DL-PRS. In case of a collision, the DL-PRS may be expected to be received at the UE. Alternatively, the collision may not be expected, and transmissions/receptions configured on other channels will be dropped by the UE, e.g., as an error case.

In a second example, the DL-PRS within the M-BWP has a lower priority than dynamically scheduled signals and a higher priority than configured signals/channels.

Figure 5:
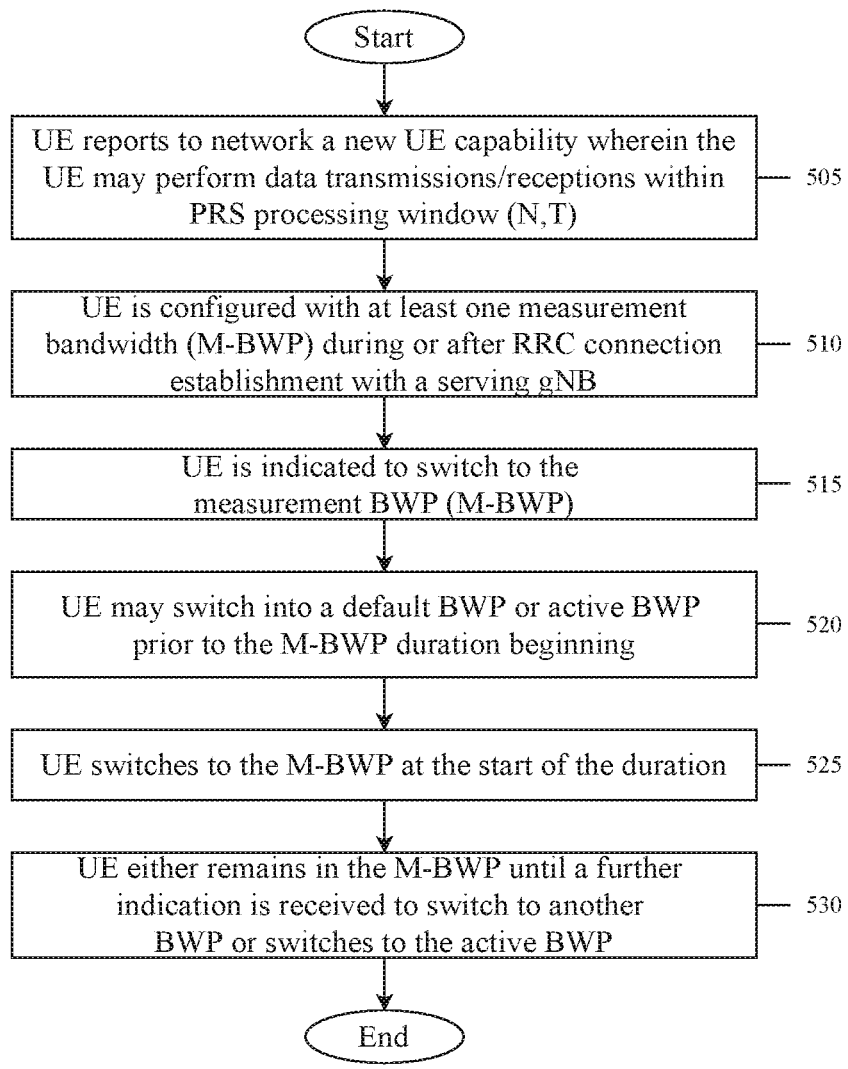
FIG. 5 shows a method for a user equipment (UE) to enter a measurement bandwidth part (M-BWP) and process received aperiodic (AP) or semi-persistent (SP) positioning reference signals (PRS) therewithin.

FIG. 5 shows a method 500 for a user equipment (UE) to enter a measurement bandwidth part (M-BWP) and process received aperiodic (AP) or semi-persistent (SP) positioning reference signals (PRS) therewithin. The M-BWP configuration/indication may reduce latency relative to a MG configuration for performing the PRS measurements. In addition, according to some exemplary embodiments, certain data transmissions/receptions may be performed within the M-BWP according to various rules.

In optional 505, the UE reports to the network a new UE capability wherein the UE may perform data transmissions/receptions within the PRS processing window (N, T). As described above, according to current specifications, the UE is not expected to perform data transmissions/receptions within the PRS processing window. Thus, if the new UE capability is defined and is configured for the UE, the network may schedule transmissions/receptions, e.g., PDSCH, during the PRS processing window. However, in other embodiments, the UE may perform measurements within the M-BWP according to currently specified UE capabilities.

In 510, the UE is configured with at least one measurement bandwidth (M-BWP) during or after RRC connection establishment with a serving gNB. The M-BWP configuration includes an association between the M-BWP and TRPs for PRS transmission. Thus, the UE has knowledge of which PRS will be transmitted from which TRPs when the M-BWP is entered. In some embodiments, the M-BWP configuration includes timing information for the PRSs to be transmitted, e.g., an offset and a duration.

In 515, the UE is indicated to switch to the measurement BWP (M-BWP). The indication may be a DCI, e.g. a UE-specific DCI or a GC-DCI, or a higher layer indication. In some embodiments, the indication includes the timing information for the PRSs to be transmitted.

In 520, when the timing information is available to the UE and a scheduling offset is included therein, the UE may switch into a default BWP or the active BWP prior to the M-BWP duration beginning.

In 525, the UE switches to the M-BWP at the start of the duration. Various options are available concerning UE transmissions/receptions while in the M-BWP. As discussed above, in one option, the UE may not receive data transmissions/receptions for the duration of the M-BWP. In one embodiment, when RRM measurements are configured during the PRS measurement, the RRM measurements may either be dropped or shared with the PRS measurements according to a sharing factor. In another option, the UE may receive data while within the M-BWP, but not during the PRS processing window. In still another option, when the new UE capability is configured for the UE, the UE may receive data while within the M-BWP, during the PRS processing window, according to various priority rules as described above.

In 530, after the M-BWP duration, the UE either remains in the M-BWP until a further indication is received to switch to another BWP, or switches to the active BWP.

EXAMPLES

In a first example, a processor of a user equipment (UE) is configured to perform operations comprising receiving a configuration for a measurement bandwidth part (M-BWP) in which one or more aperiodic or semi-persistent positioning reference signals (PRS) is to be transmitted from one or more transmission and reception points (TRP), receiving an indication to switch into the M-BWP and performing PRS measurement and processing on the M-BWP.

In a second example, the processor of the first example, wherein the indication is included in a UE-specific downlink control information (DCI).

In a third example, the processor of the first example, wherein the indication is included in a group common downlink control information (GC-DCI).

In a fourth example, the processor of the first example, wherein the indication is included in a higher layer procedure.

In a fifth example, the processor of the first example, wherein the M-BWP configuration includes an association of the M-BWP with the at least one PRS and at least one of the TRPs from which the at least one PRS is to be transmitted.

In a sixth example, the processor of the first example, wherein the M-BWP configuration includes timing information for the PRS measurement on the M-BWP including an offset and a duration.

In a seventh example, the processor of the first example, wherein the indication includes timing information for the PRS measurement on the M-BWP including an offset and a duration.

In an eighth example, the processor of the seventh example, wherein the operations further comprise switching to a default BWP or an active BWP before a start of the duration for the PRS measurement on the M-BWP.

In a ninth example, the processor of the eighth example, wherein the operations further comprise remaining in the M-BWP after the duration, switching to a default or active BWP automatically after the duration, or switching to a new BWP after receiving a further indication to switch to the new BWP.

In a tenth example, the processor of the first example, wherein the UE is not expected to receive or transmit data within the M-BWP.

In an eleventh example, the processor of the tenth example, wherein configured data transmissions or receptions scheduled during the PRS measurement on the M-BWP are dropped.

In a twelfth example, the processor of the tenth example, wherein, when a mobility measurement opportunity (MO) is configured during a duration of the PRS measurement on the M-BWP, the mobility measurement is dropped.

In a thirteenth example, the processor of the tenth example, wherein, when a mobility measurement opportunity (MO) is configured during a duration of the PRS measurement on the M-BWP, a sharing factor is used for MO sharing between the PRS measurement and the mobility measurement.

In a fourteenth example, the processor of the thirteenth example, wherein a measurement gap is configured for the mobility measurement when the UE remains on the M-BWP until all PRS measurements are completed.

In a fifteenth example, the processor of the thirteenth example, wherein a measurement gap is not configured for the mobility measurement when the UE switches from the M-BWP to an active BWP after each PRS measurement.

In a sixteenth example, the processor of the first example, wherein the UE is restricted from transmitting or receiving data during a measurement and processing window for the PRS measurements.

In a seventeenth example, the processor of the first example, wherein the operations further comprise reporting to the network a UE capability wherein the UE is allowed to perform data transmissions or receptions within a measurement and processing window for the PRS measurements.

In an eighteenth example, the processor of the fifteenth example, wherein, when a data transmission or reception collides with a PRS reception, the PRS has a higher priority for reception at the UE than the data transmission or reception.

In an nineteenth example, the processor of the fifteenth example, wherein, when a data transmission or reception collides with a PRS reception, the PRS has a higher priority for reception at the UE than configured signals or channels and a lower priority than dynamically scheduled signals.

In a twentieth example, a processor of a base station is configured to perform operations comprising transmitting to a user equipment (UE) a configuration for a measurement bandwidth part (M-BWP) in which one or more aperiodic or semi-persistent positioning reference signals (PRS) is to be transmitted from one or more transmission and reception points (TRP) to the UE, transmitting to the UE an indication to switch into the M-BWP and receiving from the UE a report comprising PRS estimations for the transmitted PRSs.

In a twenty first example, the processor of the twentieth example, wherein the indication is included in a UE-specific downlink control information (DCI).

In a twenty second example, the processor of the twentieth example, wherein the indication is included in a group common downlink control information (GC-DCI).

In a twenty third example, the processor of the twentieth example, wherein the indication is included in a higher layer procedure.

In a twenty fourth example, the processor of the twentieth example, wherein the M-BWP configuration includes an association of the M-BWP with the at least one PRS and at least one of the TRPs from which the at least one PRS is to be transmitted.

In a twenty fifth example, the processor of the twentieth example, wherein the M-BWP configuration includes timing information for the PRS measurement on the M-BWP including an offset and a duration.

In a twenty sixth example, the processor of the twentieth example, wherein the indication includes timing information for the PRS measurement on the M-BWP including an offset and a duration.

In a twenty seventh example, the processor of the twentieth example, wherein the operations further comprise transmitting a further indication to the UE to switch to a new BWP.

In a twenty eighth example, the processor of the twentieth example, wherein the UE is not expected to receive or transmit data within the M-BWP.

Those skilled in the art will understand that the above-described exemplary aspects may be implemented in any suitable software or hardware configuration or combination thereof. An exemplary hardware platform for implementing the exemplary aspects may include, for example, an Intel x86 based platform with compatible operating system, a Windows OS, a Mac platform and MAC OS, a mobile device having an operating system such as iOS, Android, etc. In a further example, the exemplary aspects of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A processor of a base station of a network configured to perform operations comprising:
    transmitting a first indication to a user equipment (UE) of a mapping of code points, wherein each code point maps to one or more corresponding aperiodic or semi-persistent positioning reference signals (PRS) to be transmitted from one or more transmission and reception points (TRP);
    transmitting a group common DCI (GC-DCI) to the UE of a first one of the mapped code points to activate the one or more corresponding aperiodic PRSs for reception at the UE; and
    transmitting the one or more activated PRSs to the UE.

2. The processor of claim 1, wherein each code point further maps each of the PRSs to a corresponding one of the TRPs.

3. The processor of claim 2, wherein the one or more TRPs are located at the base station.

4. The processor of claim 2, wherein one or more of the TRPs are located at the base station and one or more of the TRPs are located at one or more neighboring base stations.

5. The processor of claim 1, wherein the first indication is included in an LTE positioning protocol (LPP) message initiated at a location management function (LMF) of the network.

6. The processor of claim 1, wherein the first indication is included in a positioning system information block (SIB) (posSIB) broadcast by the base station.

7. The processor of claim 1, wherein the first indication is included in a radio resource control (RRC) message.

8. The processor of claim 1, wherein the operations further comprise:
    receiving from the UE a report comprising PRS estimations for the transmitted PRSs; and
    transmitting the PRS estimations to the network to inform a position determination for the UE.

9. A processor of a base station configured to perform operations comprising:
    transmitting an indication to a user equipment (UE) of a code point, wherein the code point maps to one or more corresponding aperiodic or semi-persistent positioning reference signals (PRS) to be transmitted from one or more transmission and reception points (TRP) located at the base station, the indication activating the one or more corresponding DL PRSs for reception at the UE;
    transmitting priority rules to the UE, the priority rules indicating to the UE to prioritize DL PRSs over a further DL signal when the DL PRSs are to be received i) outside of a measurement gap, ii) within a DL PRS processing window and iii) within an active bandwidth part (BWP) with a same numerology as the DL PRS; and
    transmitting the one or more activated DL PRSs to the UE.

10. The processor of claim 9, wherein the indication is a downlink control information (DCI) and the PRSs are aperiodic PRSs.

11. The processor of claim 10, wherein the DCI is a UE-specific DCI.

12. The processor of claim 9, wherein the indication is a medium access control (MAC) control element (MAC-CE) and the PRSs are semi-persistent PRSs.

13. The processor of claim 10, wherein the DCI is a group common DCI (GC-DCI).

14. A processor of a user equipment (UE) configured to perform operations comprising:
    receiving a first indication from a base station of a mapping of code points, wherein each code point maps to one or more corresponding aperiodic or semi-persistent downlink (DL) positioning reference signals (PRS) to be transmitted from one or more transmission and reception points (TRP);
    receiving a second indication from the base station of a first one of the mapped code points to activate the one or more corresponding DL PRSs for reception at the UE;
    when DL PRSs are to be received i) outside of a measurement gap, ii) within a DL PRS processing window and iii) within an active bandwidth part (BWP) with a same numerology as the DL PRS, prioritizing the DL PRSs over a further DL signal; and
    measuring the one or more activated DL PRSs.

15. The processor of claim 14, wherein each code point further maps each of the PRSs to a corresponding one of the TRPs.

16. The processor of claim 14, wherein the operations further comprise:
    receiving a third indication from a neighboring base station of a second one of the mapped code points to activate the one or more corresponding PRSs for reception at the UE, wherein the second mapped code point corresponds to PRSs to be transmitted from the neighboring base station.

17. The processor of claim 16, wherein the third indication is transmitted from a first neighboring TRP located at the neighboring base station, the third indication corresponding to PRSs to be transmitted from the first neighboring TRP, wherein the operations further comprise:

receiving a fourth indication from a second neighboring TRP located at the neighboring base station, the fourth indication corresponding to PRSs to be transmitted from the second neighboring TRP.

18. The processor of claim 14, wherein the first indication is included in an LTE positioning protocol (LPP) message initiated at a location management function (LMF) of a network.

19. The processor of claim 14, wherein the first indication is included in a positioning system information block (SIB) (posSIB) broadcast by the base station.

20. The processor of claim 14, wherein the first indication is included in a radio-resource control (RRC) message.

* * * * *